(12) United States Patent
Nimmagadda et al.

(10) Patent No.: US 12,106,154 B2
(45) Date of Patent: Oct. 1, 2024

(54) SERVERLESS COMPUTING ARCHITECTURE FOR ARTIFICIAL INTELLIGENCE WORKLOADS ON EDGE FOR DYNAMIC RECONFIGURATION OF WORKLOADS AND ENHANCED RESOURCE UTILIZATION

(71) Applicant: Intel Corporation, Santa Clara, CA (US)

(72) Inventors: Yamini Nimmagadda, Portland, OR (US); Akhila Vidiyala, Beaverton, OR (US); Suryaprakash Shanmugam, Santa Clara, CA (US); Divya Prakash, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 17/406,711

(22) Filed: Aug. 19, 2021

(65) Prior Publication Data

US 2021/0382754 A1 Dec. 9, 2021

(51) Int. Cl.
*G06F 9/46* (2006.01)
*G06F 9/50* (2006.01)
*G06N 3/08* (2023.01)

(52) U.S. Cl.
CPC ............ *G06F 9/505* (2013.01); *G06F 9/5016* (2013.01); *G06F 9/5072* (2013.01); *G06N 3/08* (2013.01)

(58) Field of Classification Search
CPC ...... G06F 9/505; G06F 9/5016; G06F 9/5072; G06N 3/08
See application file for complete search history.

*Primary Examiner* — Gregory A Kessler
(74) *Attorney, Agent, or Firm* — Jordan IP Law, LLC

(57) ABSTRACT

Systems, apparatuses and methods include technology that analyzes an input stream and an artificial intelligence (AI) model graph to generate a workload characterization. The workload characterization characterizes one or more of compute resources or memory resources, and the one or more of the compute resources or the memory resources is associated with execution of the AI model graph based on the input stream. The technology partitions the AI model graph into subgraphs based on the workload characterization. The technology selects a plurality of hardware devices to execute the subgraphs.

25 Claims, 9 Drawing Sheets

SERVERLESS COMPUTING ARCHITECTURE FOR ARTIFICIAL INTELLIGENCE WORKLOADS ON EDGE FOR DYNAMIC RECONFIGURATION OF WORKLOADS AND ENHANCED RESOURCE UTILIZATION

CROSS-REFERENCE TO RELATED APPLICATION

The present application claims the benefit of priority to Indian Patent Application No. 202141026227, filed on Jun. 12, 2021.

TECHNICAL FIELD

Embodiments generally relate to processing architectures that execute artificial intelligence (AI) processing. More particularly, embodiments relate to analyzing an input stream and an AI model to characterize compute and memory resources, and partitioning the AI model and the input stream for distributed processing across heterogeneous devices.

BACKGROUND

With the proliferation of artificial intelligence (AI) use-cases on edge, usage of on edge clusters with heterogeneous compute capacity and varying resources is expanding in scope and size. A challenge is to partition and distribute AI workloads on heterogeneous accelerators and dynamically reconfigure the partitioning as more models or data streams are added and/or removed. AI workloads have unique characteristics, memory requirements and/or compute requirements. A uniform approach across workloads may inefficiently not meet performance and resource utilization standards for AI workloads. For example, conventional approaches of workload management may not appreciate the compute present in the AI workloads, rely on static approaches and inefficiently distribute workloads resulting in inefficient execution, longer latency and increased power consumption.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Embodiments as described herein implement an apparatus, method and system that readily schedules AI workloads in an efficient and enhanced fashion based on unique characteristics of the AI workloads. For example, an AI workload may include an input stream, an AI model (which may be an AI model graph corresponding to functions and operations of a neural network) and associated AI processes to process (e.g., classify) the input stream with the AI model. Characteristics (e.g., required computational and memory resources) of execution of the AI model and the input stream may be predicted. Some embodiments partition the workload (e.g., the AI model and the input stream) based on the characteristics. Furthermore, some embodiments dynamically readjust distribution of the AI model when additional AI models and/or input streams are received.

Thus, some embodiments analyze input streams and AI models, characterizes compute and memory requirements of the input streams and the AI models, partitions the input streams and the AI models based on the compute and memory requirements and distributes the partitioned AI models and input streams on edge devices (e.g., compute nodes). The edge devices may form a heterogeneous cluster with varying memory and hardware resources. Such embodiments provide enhanced performance and resource utilization with low latency for AI workloads in an edge cluster with heterogeneous accelerators.

For example, larger AI models (e.g., AI model graphs) and input streams may be partitioned based on workload characterizations, and into smaller AI models (which may comprise one or more nodes or subgraphs of the AI model graphs) to execute efficiently within the memory and computational constraints of hardware devices that exist in the heterogeneous cluster. Doing so reduces latency since execution may less frequently be stalled and execute on hardware devices that are specialized in processing specific aspects (e.g., data types and/or operations) of subgraphs of the AI model graph. Moreover, memory bandwidth and processing power may be conserved since data retrieval from long term storage may be reduced. Furthermore, the partitioned subgraphs of the AI models may be individually distributed, which permits granular distribution of the partitioned AI models to different hardware devices that are able to efficiently process data with the partitioned AI models.

Figure 1:
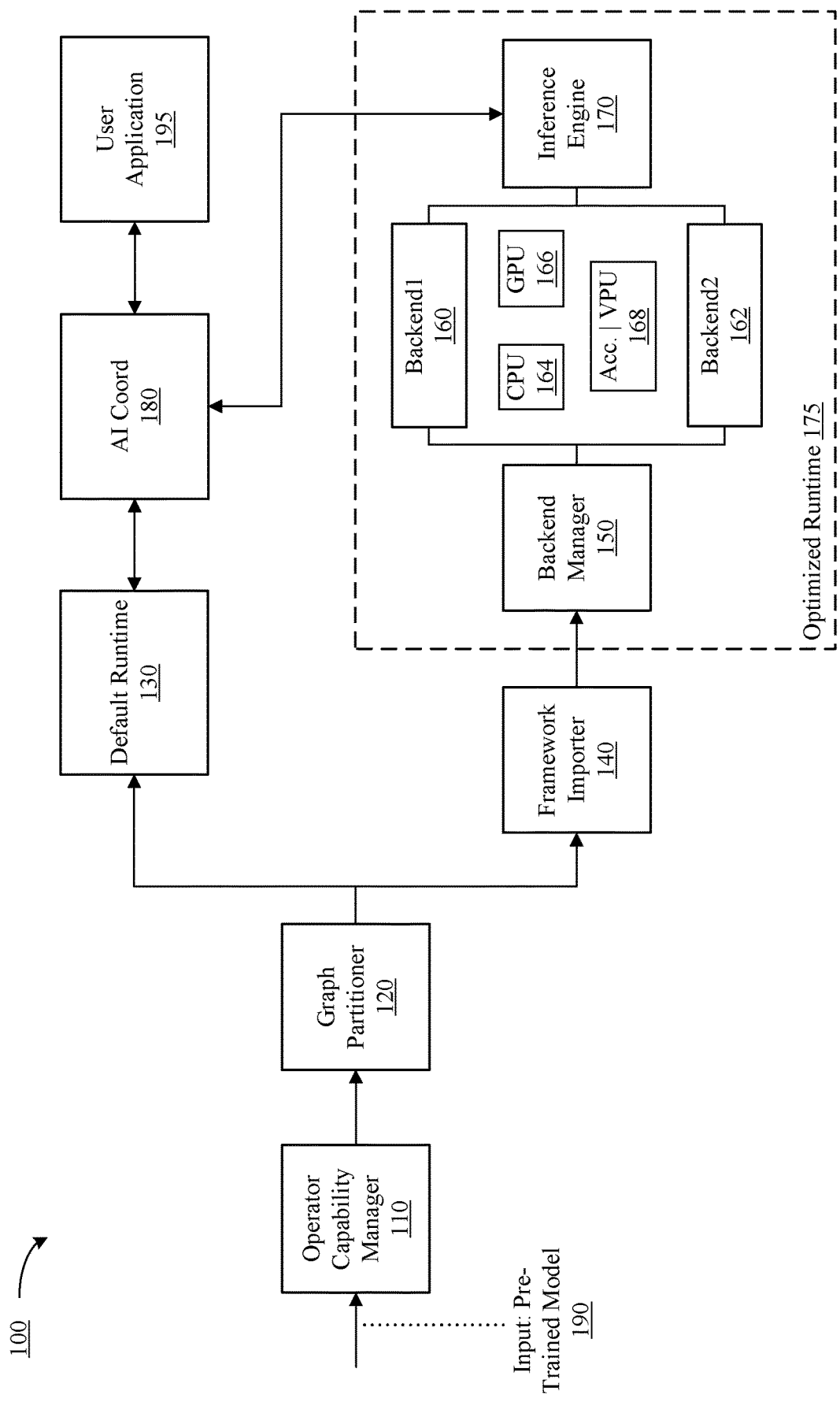
FIG. 1 is a block diagram of an example of a block an AI framework integration system according to an embodiment.

Turning now to FIG. 1 provides a block diagram illustrating an example of an AI framework integration system 100 according to one or more embodiments, with reference to components and features described herein including but not limited to the figures and associated description. As shown in FIG. 1, the system 100 includes an operator capability manager 110, a graph partitioner 120, a default runtime 130, a framework importer 140, a backend manager 150, a first backend (backend1) 160, a second backend (backend2) 162, hardware execution units including a CPU 164, a GPU 166, and a hardware accelerator such as a vision processing unit (VPU) (or another type of hardware AI accelerator), an inference engine 170 and an AI coordinator 180. It is understood that a variety of hardware execution units including a plurality of CPUs 164, GPUs 166 and/or VPUs 168 can be employed in the system 100. It is further understood that a variety of backends can be included in the system 100. Together, the backend manager 150, the first backend (backend1) 160, the second backend (backend2) 162, the hardware execution units (including one or more CPUs 164, one or more GPUs 166, and one or more VPUs 168) and the inference engine 170 form an optimized runtime 175.

The system 100 receives as input a pre-trained model 190. The pre-trained model 190 may be developed using an AI framework from a variety of sources, including, for example, TensorFlow, ONNX Runtime, PyTorch, etc. The pre-trained model 190 typically includes information and data regarding the model architecture (i.e., graph), including nodes, operators, weights and biases. Each node in a model graph represents an operation (e.g. mathematical, logical operator etc.) which is evaluated at runtime.

The operator capability manager 110 receives the input pre-trained model 190 and analyzes the operators in the model to determine which operators or nodes are supported, and under what conditions, by the available backend technology and hardware units. The analysis includes evaluating the operators, attributes, data types (e.g., precision data types), and input nodes. The operator capability manager 110 marks the operators or nodes as supported or unsupported.

The graph partitioner 120 takes the pretrained model architecture, as marked by the operator capability manager 110, and partitions (e.g., divides) the model into subgraphs (i.e., groups of operators, or clusters). The subgraphs are allocated into two groups—supported subgraphs and unsupported subgraphs. Supported subgraphs are those subgraphs having operators or nodes that are supported by the available backend technology and hardware units under the conditions present in the model. Unsupported subgraphs are those subgraphs having operators or nodes that are not supported by the available backend technology and hardware units under the conditions present in the model. Supported subgraphs are designated for further processing to be run via the optimized runtime 175. Unsupported subgraphs are designated to be run via the default runtime 130. In some circumstances, the system can be "tuned" to enhance speed and efficiency in execution speed and/or memory usage by re-designating certain supported subgraphs to be executed via the default runtime.

The default runtime 130 is the basic runtime package provided for the AI framework corresponding to the input pre-trained model 190. The default runtime 130 executes on basic CPU hardware with no hardware accelerator support. The default runtime 130 typically includes a compiler to compile the unsupported subgraphs into executable code to be run on the basic CPU hardware.

The framework importer 140 receives supported subgraphs from the graph partitioner 120. The subgraphs are typically in a format specific to the framework used to generate the model. The framework importer 140 takes the subgraphs and generates an intermediate representation for these subgraphs, to be interpreted (i.e., read/parsed) by the optimized runtime 175. The intermediate representation produces a structured data set comprising the model architecture, metadata, weights and biases.

The backend manager 150 receives the intermediate representation of the supported model subgraphs and applies optimization techniques to optimize execution of the model using available backends and hardware options. For example, the backend manager 150 can select among available backends, e.g., the backend1 160 or the backend2 162. In some embodiments, the backend1 160 represents a basic backend that is optimized for a particular group of hardware units. For example, where the optimized runtime 175 utilizes the Open Visual Inference and Neural network Optimization (OpenVINO) runtime technology, the backend1 160 can be the OpenVINO backend. In some embodiments, the backend2 162 can be a backend such as VAD-M, which is optimized for machine vision tasks using a VPU such as the Intel® Myriad X VPU. The selected backend compiles (via a compiler) supported subgraphs into executable code, and performs optimization. The backend manager also selects among the available hardware units—the CPU 164, GPU 166 and/or VPU (or AI accelerator) 168. The backend manager 150 also dispatches data to the selected backend and schedules execution (inference) of the optimized model via the inference engine 170.

The inference engine 170 controls execution of the model code on the various hardware units that are employed for the particular model optimization. The inference engine 170 reads the input data and compiled graphs, instantiates inference on the selected hardware, and returns the output of the inference.

The AI coordinator 180 coordinates execution of AI workflow requests from a user application 195. The AI workflow requests are handled between the default runtime 130 (executing code generated from unsupported subgraphs) and the optimized runtime 175 (e.g., executing code generated from supported subgraphs). In one or more embodiments, the AI coordinator 180 is integrated within the default runtime 130. In one or more embodiments, the AI coordinator 180 is integrated within the optimized runtime 175.

Some or all components in the system 100 may be implemented using one or more of a CPU, a GPU, an AI accelerator, a FPGA accelerator, an ASIC, and/or via a processor with software, or in a combination of a processor with software and an FPGA or ASIC. More particularly, components of the system 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

For example, computer program code to carry out operations by the system 100 may be written in any combination of one or more programming languages, including an object oriented programming language such as JAVA, SMALLTALK, C++# or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 2:
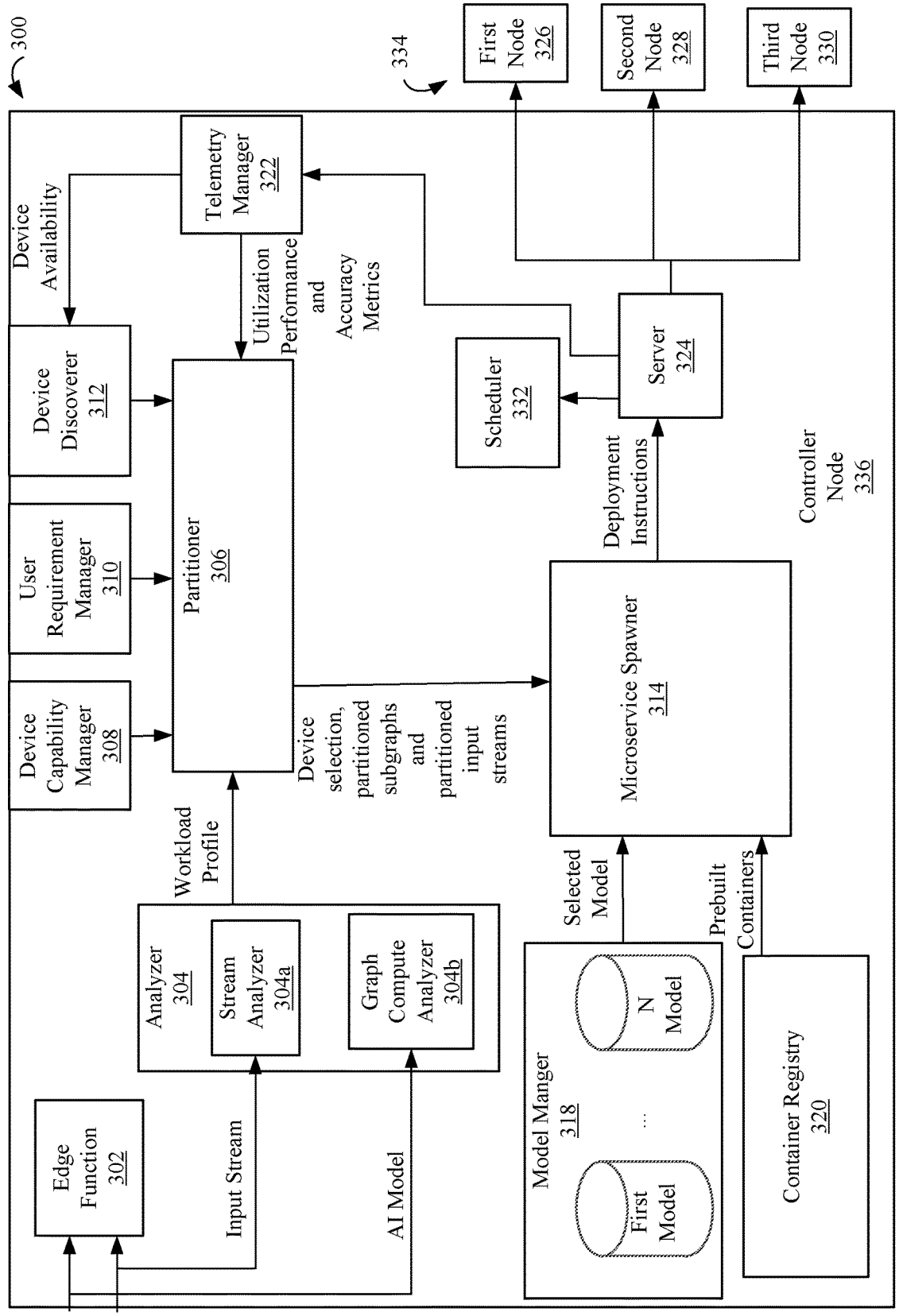
FIG. 2 is a diagram of an example of an edgeless AI architecture according to an embodiment.

FIG. 2 shows an edgeless AI architecture 300 that executes compute-based graph partitioning according to one or more embodiments. In detail, a controller node 336 (e.g., a server) may identify an edge function 302 (e.g., an edge lambda). The edge function 302 may include one or more functions written for implementing a specific functionality in an AI workload. The edge function 302 may be hardware agnostic at least to the extent that the edge function 302 may not be configured for (e.g., optimized) for a specific hardware backend. The edge function 302 permits a flexible and agnostic process of developing an application and associated functions with a given set of application programming interfaces (APIs). As will be discussed below, the edgeless AI architecture 300 allows for an automatic selection of one or more available devices and optimizes the edge function 302 automatically for the one or more available devices. The edge function 302 may be composed of on an input stream and an AI model (e.g., an AI model graph). The architecture 300 includes an analyzer 304 that analyzes the input stream and AI model to determine whether to partition the input stream and the AI model, and distribute to hardware devices accordingly.

The analyzer 304 characterizes the workload of the edge function 302 based on the input stream and the AI model to create a workload profile. The workload profile characterizes compute resources and/or memory resources that will be required during execution of the edge function 302. In some examples, the workload profile represents types of operations in the model, whether specific hardware units are required for execution, input streams, resolution, bitrates, encode formats, decode formats, compute in the AI model (e.g., measured in floating point operations (FLOPS), tera operations (TOPS), etc.), whether certain data formats (e.g., fp16, bfloat16, int16, etc.) are required for execution and so forth.

The analyzer 304 includes a stream analyzer 304a. The stream analyzer 304a determines stream characteristics of the input stream. The stream characteristics may include a number of input streams (if the input stream includes more than one input stream), resolution of the input stream, bitrates of the input stream, an encode format of the input stream, and/or a decode format of the input stream. As will be discussed below, the stream characteristics may be used to determine the workload partitioning for the edge function 302 (e.g., applications that include media pre/post processing along with inference).

A graph compute analyzer 304b determines compute and/or memory characteristics of the AI model. For example, the AI model may include a series of layers. The layers may be represented as nodes within the model graph. The graph computer analyzer 304b may determine compute (e.g., FLOPS or TOPS) present in each layer and intermediate data output sizes for each layer. The compute and the intermediate data output sizes may thus be mapped to the AI model. These metrics may be used to determine the AI workload partitioning. In some examples, the graph compute analyzer 304b may include a graph compute library.

As noted, a node in the AI model may also be referred to as a layer. As one example, each layer may be the representation of a DL operator type in the AI model with a specific set of attributes and weights. For example, a series of layers may include "conv1 to conv2 to pool1 to softmax." In this case, cony1, conv2, pool1, softmax are layers or nodes in the AI model. Conv1 and conv2 layers are derived from a type of operator known as the "convolution" operator. Conv1 and conv2 each include specific (and different) attributes and weights. Embodiments may determine the FLOPS and/or TOPS of each operator based on machine learning, algorithms, or by access to a lookup tables that includes the operator types and associated FLOPS which may be looked up based on the attributes and weights. For each layer, some embodiments utilize and substitute the values specific to that layer to calculate FLOPS based on the type of operator (e.g., an algorithm for the operator to calculate the FLOPS).

The analyzer 304 may combine the stream characteristics from the stream analyzer 304a and the compute and/or memory characteristics from graph compute analyzer 304b into the workload profile. The analyzer 304 may provide the workload profile to a partitioner 306.

The partitioner 306 may ingest the workload profile and use this information to partition the workload by partitioning the input stream and the model. For example, the partitioner 306 may seek to enhance load balancing and lower latency during execution of the partitioned input stream and model. The partitioner 306 further selects hardware devices from an available pool of resources to schedule the execution of the workload.

Along with the workload profile, the partitioner 306 may partition the input stream and the model based on inputs from several other modules. For example, a device capability manager 308 maintains supported data types and the supported Deep Learning (DL) operators for each hardware device. That is, some hardware devices may only support certain types of DL operators (e.g., mathematical operator such as multiply or subtract, a logical operator, convolution operator, pool operator, constant operator, retrieval, etc.) due to memory and processing constraints of the hardware device. For example, DL operators may be compatible with and execute on a given hardware device (e.g., a backend) under certain conditions such as operator attributes, data formats, precision, and input sizes due to the architectural limitations of the backend hardware. That is, in order to support a given operator, the hardware device may have to support required operator attributes, data formats (e.g., BF16, INT16, etc.) utilized by the operator, precision required by the operator, and input sizes required by the operator.

Thus, each operator is assigned to hardware devices that are able to the support the operator (e.g., support the operator attributes, precision of the operator, and input sizes of the operator). Thus, the hardware devices that are unable to support an attributes of an operator, precision of the operator, and input sizes of the operator may be excluded from executing the operator. An operator, and the corresponding layers of the AI model that correspond to the operator, assigned to execute on a hardware device based on foregoing.

It is worthwhile to note that some embodiments may partition the input stream and the AI model based on the device compatibility of operators. For example, a first operator may execute at a higher efficiency on a first hardware device, but a lower efficiency on a second hardware device. The converse may be true of a second operator. That is, the second operator may execute at a lower efficiency on the first hardware device, but a higher efficiency on a second hardware device. Thus, in response to the efficiency identifications above, the partitioner 306 may partition the AI model (e.g., a graph) to generate a first subgraph of the AI model that includes the first operator, and a second subgraph of the AI model that includes the second operator. The partitioner 306 may assign the first subgraph to execute on the first hardware device based on the first operator being efficiently executed on the first hardware device. The partitioner 306 may assign the second subgraph to operate on the second hardware device based on the second operator being efficiently executed on the second hardware device.

It is worthwhile to note that the input stream is also partitioned depending on which inputs of the input stream are associated with the first subgraph (provide inputs to operators and/or nodes of the first subgraph), and which inputs of the input stream are associated with the second subgraph (provide inputs to operators and/or nodes of the second subgraph). For example, the analyzer 304 may partition the input stream into a first portion (associated with execution of the first subgraph) and a second portion (associated with execution of the second subgraph). The first portion is associated with the first subgraph and is accordingly assigned to the first hardware device, while the second portion is associated with the second subgraph and is accordingly assigned to the second hardware device.

A user requirement manager 310 provides user requirements and/or constraints. The user requirement manager 310 ingests requirements provided by the user regarding performance, accuracy, device of choice, priority of the models etc. The partitioner 306 may partition the input stream and AI model based on the user constraints. For example, the partitioner 306 may treat the user requirements as constraints that are to be met while optimizing the resource allocation.

A device discoverer 312 maintains up-to-date information about the presence of hardware devices of first, second and third nodes 326, 328, 330 (e.g., compute devices) in a cluster 334. The device discoverer 312 also receives the usage of the first, second and third nodes 326, 328, 330 of the cluster 334 at a given time and maintains the information about the utilization of the first, second and third nodes 326, 328, 330. The partitioner 306 may assign partitions to available devices based on the information provided by the device discoverer 312. In some examples, the partitioner 306 may further partition the input stream and the AI model based on the available devices to avoid waiting for unavailable devices. For example, if two hardware devices may support a larger subgraph of the AI graph, the larger subgraph may be divided into two smaller subgraphs to opportunistically utilize the available hardware devices. If however only one hardware device is able to support the larger subgraph of the AI graph, then the larger subgraph may not be subdivided and is assigned to the one hardware device.

Thus, the partitioner 306 may partition the input stream and the AI model into partitioned input streams and subgraphs based on device capabilities, user requirements and available devices. Furthermore, the partitioner 306 may assign the partitioned input streams and the subgraphs to available devices.

After the partitioner 306 partitions the AI model into model subgraphs, partitions the input stream into partitioned input streams and selects the hardware devices for execution, a microservice spawner 314 generates microservices using prebuilt containers from a container registry 320, that are packaged with a minimum required software libraries to run inference on selected hardware devices. If the AI model is partitioned into multiple subgraphs, then subgraphs and corresponding weights are deployed along with the containers for the selected devices.

A model manager 318 stores previously efficiency enhanced first-N models for future consumption. The first-N models may include a standard model, FP32 intermediate representation, FP16 intermediate representation, INT8 intermediate representation, a precompiled blob (e.g., a model that is compiled to generate an accelerator-compatible blob that is optimized for a target accelerator) and so forth. The first-N models may correspond to subgraphs that were previously optimized for execution on specific hardware devices. The first-N models may be reused to reduce processing power and latency.

For example, in some embodiments, the generation of the first-N models involves many steps such as quantization, high-level graph enhancements such as node fusions and redundant node removal, target-specific compilation (e.g., for a specific hardware device), etc. These steps are time-consuming and require significant processing power. Thus, each of the first-N models may be dedicated to and mapped to a specific type of hardware device and subgraph. As such, the model manager 318 stores the previously efficiency enhanced first-N models and maintains a mapping of the efficiency enhanced first-N models with the corresponding devices. Using this mapping, the model manager 318 serves the appropriate best fit (best performance) model to the microservice spawner 314 suitable for the selected devices.

For example, suppose that in a previous instance, a first subgraph was assigned to operate on a first hardware device, and thus was enhanced (e.g., to operate with specific data types, memory constraints, etc.) to generate an enhanced version of the first subgraph optimized for operation on the first hardware device. The enhanced version of the first subgraph may be stored as the first model in the model manager 318. Suppose that sometime thereafter, the AI model is partitioned to generate the first subgraph (or a graph substantially similar to the first subgraph) and is again assigned to the first hardware device (or a same type of hardware device as the first hardware device). The model manager 318 may identify that the first model is mapped to the first hardware device and the first subgraph, and retrieves the first model while bypassing the many enhancement steps (e.g., quantization) described above to execute the first model on the first hardware device. The first model (which is an efficiency enhanced version of the first subgraph) may be executed on the first hardware device instead of the original first subgraph.

If a subgraph was not previously optimized for a target, the model manager 318 may be unable to provide a model for the subgraph. In such an instance, the microservice spawner 314 may optimize the subgraph (e.g., quantization, high-level graph enhancements such as node fusions and redundant node removal, target-specific compilation for the target) to generate an enhanced model. The model manager 318 may store the enhanced model in association with the target (a hardware device) and the subgraph.

The microservice spawner 314 provides deployment instructions to a server 324 (e.g., a Kubernetes framework). The server 324 may communicate with a scheduler 332 (e.g., a Kubernetes framework) to schedule the partitioned AI models and input streams on the cluster 334 which includes the first node 326, second node 328 and third node 330. The first node 326, second node 328 and third node 330 (e.g., edge devices) may include the aforementioned hardware devices and execute the subgraphs and inputs streams. For example, the microservice spawner 314 may provide models from the first-N models and containers to the server 324, along with an indication of the selected hardware devices that are to execute the models (which correspond to subgraphs) and containers. The server 324 may in turn provide the models, the containers and partitioned input streams to the selected hardware devices on the first, second and third nodes 326, 328, 330 for execution.

The server 324 communicates with a telemetry manager 322 that deploys telemetry agents on the first, second and third nodes 326, 328, 330 present in the cluster 334. The telemetry agents collect information about the device utilization and availability and provides such information to the partitioner 306. For example, the telemetry manager 322 gathers the information and then relays the information to the device discoverer 312 for partitioning the workloads and selecting suitable devices for deployment. The telemetry manager 322 may also provide utilization, performance and accuracy metrics to the partitioner 306.

The model may be a DL model graph that may contain many operators, some of which are supported by the backend and some of which are not supported by the backend. The compute-based subgraph partitioning technology described partitions the DL model graph herein helps to reduce or eliminate inefficiencies such as waiting, memory accesses and excessive power usage during execution of the deep learning model graph.

Figure 3:
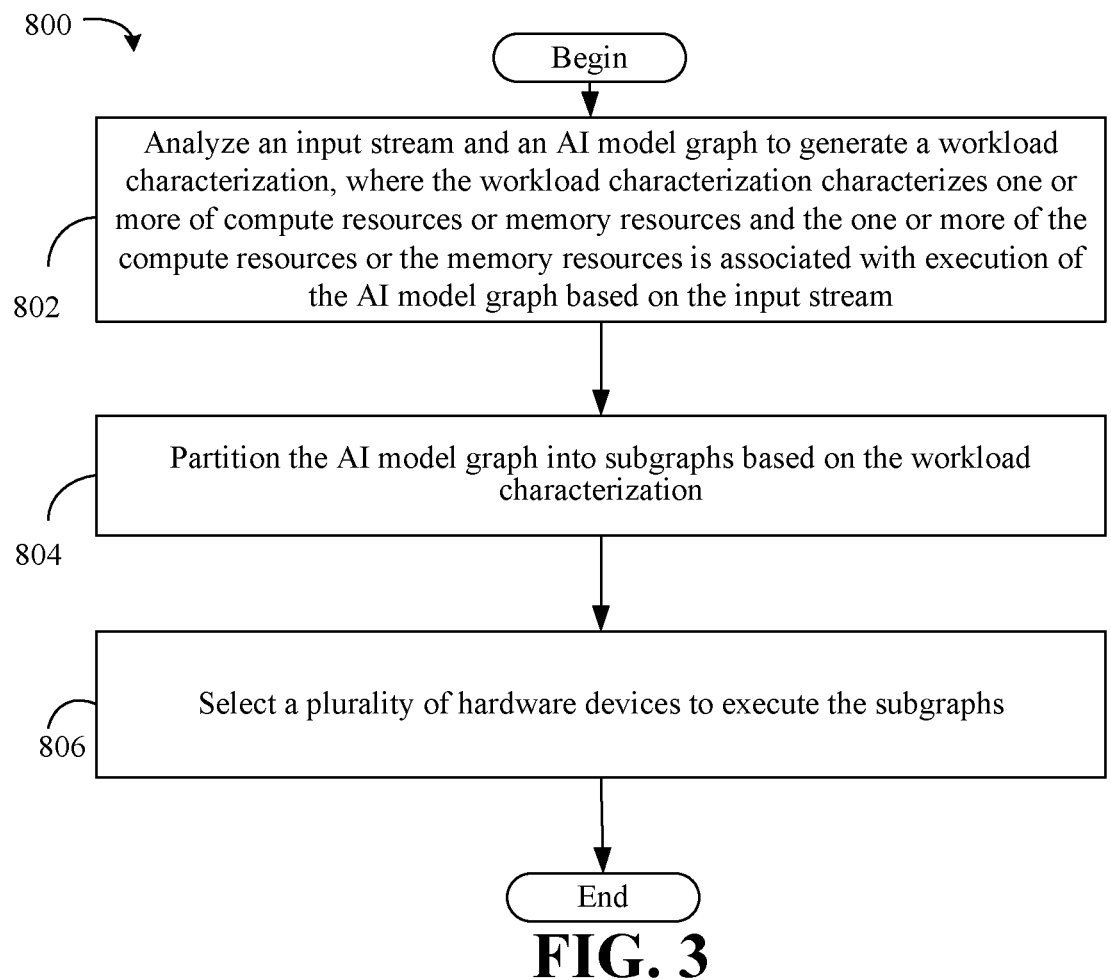
FIG. 3 is a flowchart of an example of a method of AI workload partitioning according to an embodiment.

FIG. 3 shows a method 800 of AI workload partitioning. The method 800 may generally be implemented with the embodiments described herein, for example, the system 100 (FIG. 1) and/or the architecture 300 (FIG. 2), already discussed. In an embodiment, the method 800 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 800 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 802 analyzes an input stream and an AI model graph to generate a workload characterization, where the workload characterization characterizes one or more of compute resources or memory resources and the one or more of the compute resources or the memory resources is associated with execution of the AI model graph based on the input stream. Illustrated processing block 804 partitions the AI model graph into subgraphs based on the workload characterization. Illustrated processing block 806 selects a plurality of hardware devices to execute the subgraphs.

In some examples, method 800 further includes identifying data formats supported by available hardware resources, identifying DL operators that are supported by the available hardware resources and selecting the plurality of hardware devices from the available hardware resources based on the data formats and the deep learning operators. In such examples, the method 800 further includes identifying data formats associated with the AI model graph, identifying deep learning operators associated with the AI model graph and selecting the plurality of hardware devices from the available hardware resources based on the data formats associated with the AI model graph and the deep learning operators associated with the AI model graph.

In some examples, the method 800 further includes determining a measure of a compute workload of the AI model graph, determining data output sizes of the AI model graph and partitioning the input stream and the AI model graph into partitioned input streams and the subgraphs based on the measure of the compute workload and the data output sizes. In some examples, the method 800 further includes determining one or more characteristics of the input stream. The one or more characteristics include a number of input streams, a resolution, a bitrate, an encode format or a decode format and partitioning the input stream and the AI model graph into partitioned input streams and the subgraphs based on the one or more characteristics. In some examples, the method 800 further includes selecting an AI model from a plurality of AI models based on the plurality of the hardware devices where the AI model corresponds to a subgraph of the subgraphs.

Figure 4:
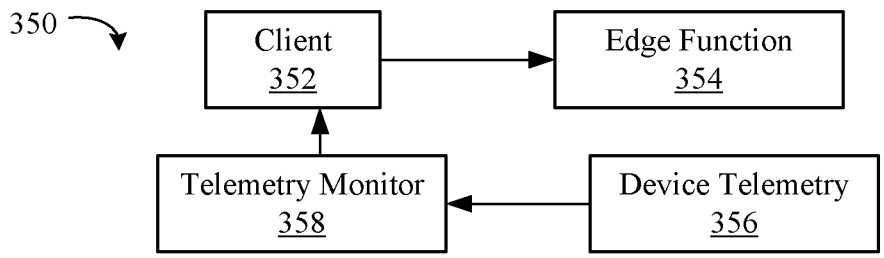
FIG. 4 is a block diagram of an example of a worker node according to an embodiment.

FIG. 4 illustrates a worker node 350. The worker node 350 may be readily substituted for the first node 326, the second node 328 and/or the third node 330 (FIG. 2). As illustrated, the worker node 350 includes a client 352. The client 352 may interface with a server, such as the server 324 (FIG. 2). The worker node 350 may execute an edge function 354, that corresponds to a subgraph, based on a partitioned input stream. That is, the edge function 354 may process and receive the partitioned input stream to execute. Device telemetry 356 is provided to a telemetry monitor 358. The telemetry monitor 358 may translate the device telemetry 356 into a format compatible with the server, and provide the translated device telemetry 356 to client 352 for transmission to the server. The server may provide the translated device telemetry 356 to interested parties, such as the telemetry manager 322 (FIG. 2).

Figure 5:
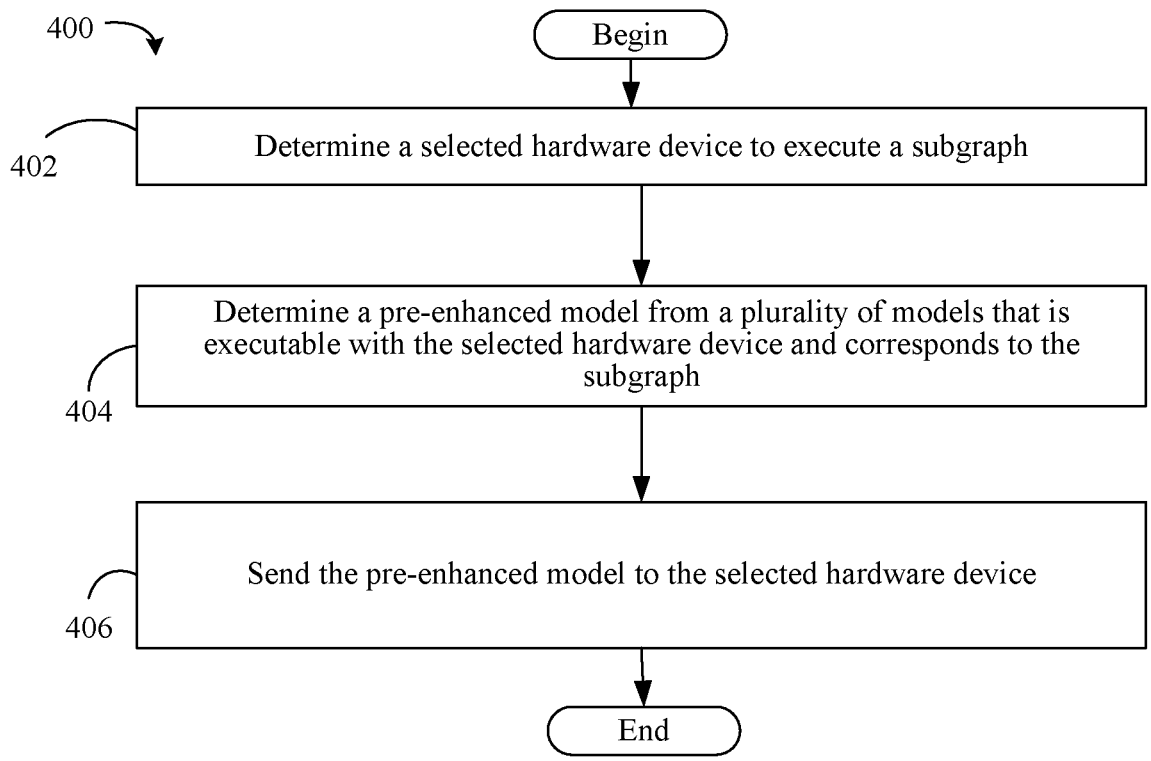
FIG. 5 is a flowchart of an example of a method of pre-enhanced model selection according to an embodiment.

FIG. 5 shows a pre-enhanced model selection method 400. The method 400 may generally be implemented with the embodiments described herein, for example, the system 100 (FIG. 1), the edgeless AI architecture 300 (FIG. 2) and/or method 800 (FIG. 3) already discussed. The method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 402 determines a selected hardware device to execute a subgraph. Illustrated processing block 404 determines a pre-enhanced model from a plurality of models that is executable with the selected hardware device and corresponds to the subgraph. For example, the subgraph may have been previously analyzed to enhance execution on the hardware device and to generate an enhanced model (e.g., an enhanced subgraph that is more efficiently executed on the selected hardware device). The enhanced model may have been previously utilized for execution on the selected hardware device. The enhanced model may be stored, and then retrieved later by processing block 404. For example, illustrated processing block 404 determines that the pre-enhanced model corresponds to the subgraph (the subgraph was previously modified into the pre-enhanced model) and is executable with the selected hardware device. Illustrated processing block 406 sends the pre-enhanced model to the selected hardware device for execution instead of the subgraph.

Figure 6:
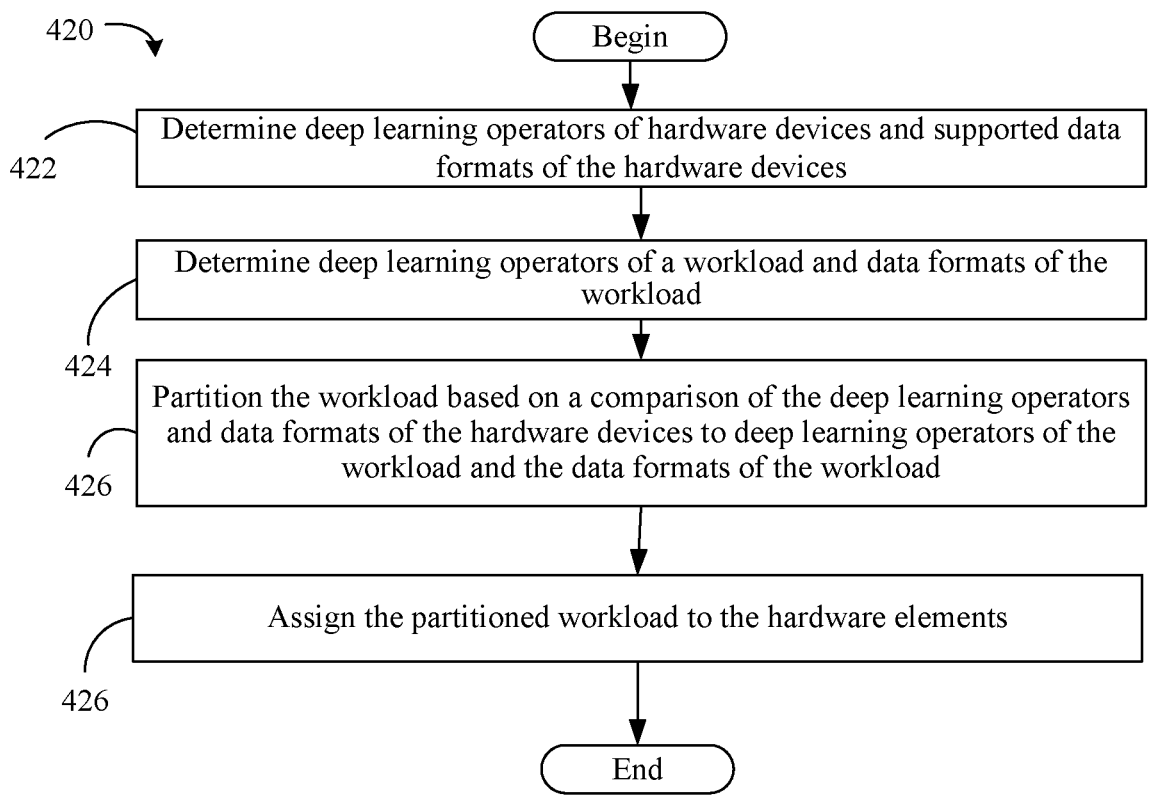
FIG. 6 is a flowchart of an example of a method of partitioning a workload based on deep learning operators and data formats according to an embodiment.

FIG. 6 shows a partitioning method 420 to partition a workload based on DL operators and data formats. The method 420 may generally be implemented with the embodiments described herein, for example, system 100 (FIG. 1), the edgeless AI architecture 300 (FIG. 2), method 800 (FIG. 3), and/or method 400 (FIG. 5) already discussed. The method 420 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 422 determines DL operators of hardware devices and supported data formats (e.g., FP32, FP 16, INT 8, etc.) of the hardware devices. Illustrated processing block 424 determines deep learning operators of a workload and data formats of the workload. Illustrated processing block 426 partitions the workload based on a comparison of the deep learning operators and data formats of the hardware devices to deep learning operators of the workload and the data formats of the workload. For example, the processing block 426 may partition the workload so that subgraphs may each operate on a single hardware device that matches the DL operators and data formats of the subgraph. That is, processing block 426 avoids partitioning the workload such that a subgraph must execute on more than one hardware device due to a single hardware device not supporting the data formats and/or DL operators of the subgraph. Thus, each subgraph is able to execute on one hardware device. For example, the DL operators of the hardware device and supported data formats of the hardware device include the DL operators of the subgraph and the data formats of the subgraph respectively. Illustrated processing block 426 assigns the partitioned workload to the hardware elements based on which hardware elements are able to support subgraphs of the partitioned workload (e.g., each subgraph is assigned to a hardware device that is able to fully support execution of the subgraph).

Figure 7:
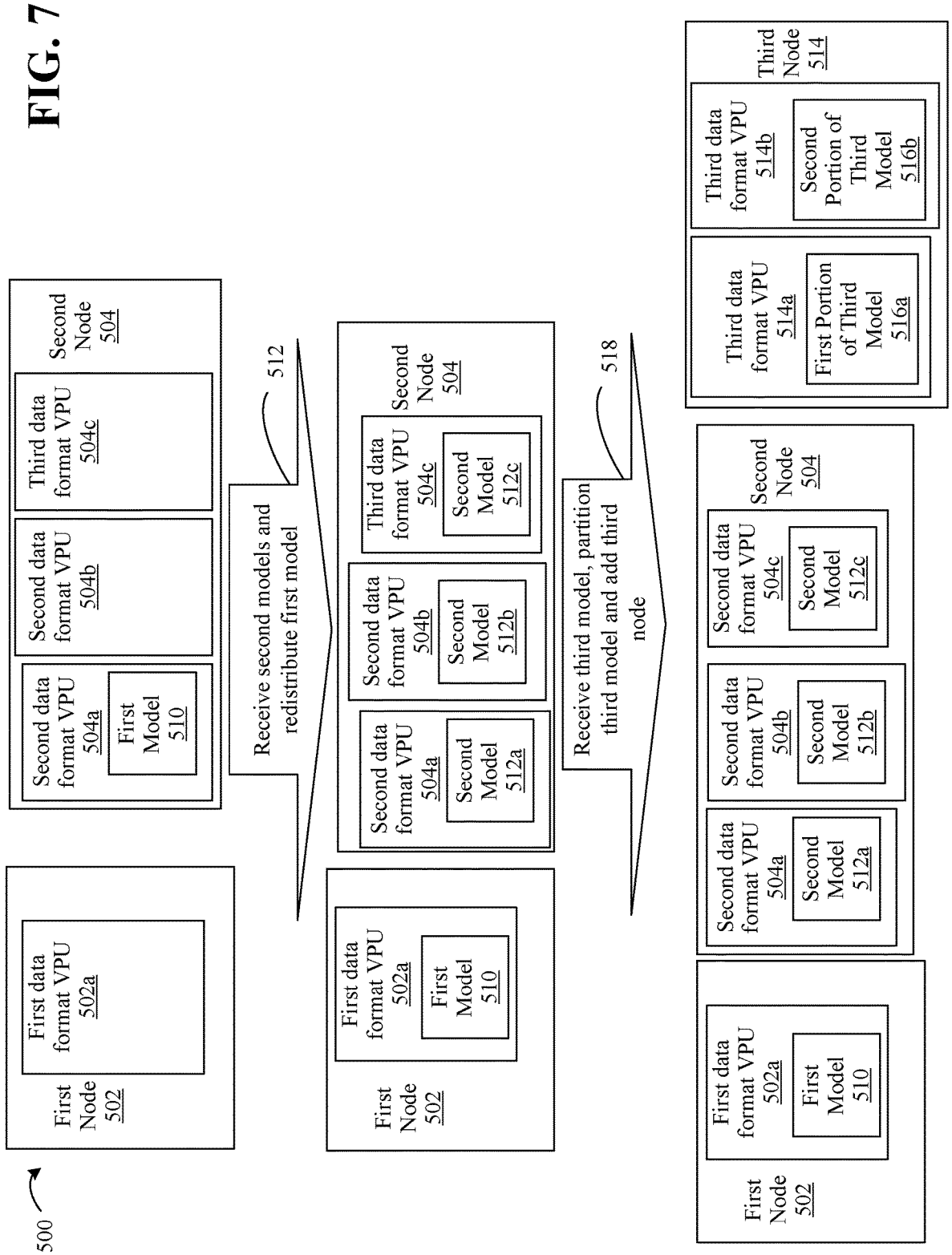
FIG. 7 is a process of an example of distributing and assigning workloads according to an embodiment.

FIG. 7 shows a distribution process 500 to distribute and assign workloads among a plurality of nodes. The process 500 may generally be implemented with the embodiments described herein, for example, for example, the system 100 (FIG. 1), the edgeless AI architecture 300 (FIG. 2), method 800 (FIG. 3), worker node 350 (FIG. 4), method 400 (FIG. 5) and/or method 420 (FIG. 6) already discussed. The process 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process 500 includes a first node 502 (e.g., an edge device) that includes a first data format VPU 502a (e.g., an FP16 format). A second node 504 (e.g., an edge device) may represent a more advanced architecture than the first node 502 and includes second data format (e.g., INT8) VPUs 504a, 504b, 504c. As illustrated a first model 510 is being executed on the second data format VPU 504a. The process 500 includes receiving second models 512a, 512b, 512c and redistributing the first model 510, 512. For example, there are three instances of the second models 512a, 512b, 512c that may require the advanced architecture of the second node 504 to operate. In contrast, the first model 510 may operate on either the first node 502 or the second node 504. Thus, the first model 510 is pushed to the first node 502 to execute on the first data format VPU 502a. In some examples, a corresponding version of the first model 510 that is optimized for the first data format VPU 502a is identified and provided to the first data format VPU 502a. The second models 512a, 512b, 512c are distributed to the second data format VPU 504a, 504b, 504c respectively. Thereafter, process 500 receives a third model, partitions the third model and adds a third node 514, 518 (e.g., an edge device). For example, the third model may have memory and/or compute requirements that exceed the memory and/or compute individually supported by the first data format VPU 502a, second data format VPUs 504a, 504b, 504c and third data format VPUs 514a, 514b. Thus, the third model is partitioned into the first portion of the third model 516a and the second portion of the third model 516b. The first portion of the third model 516a executes on the third node 514 in the third data format VPU 514a, and the second portion of the third model 516b executes on the third node 514.

Figure 8:
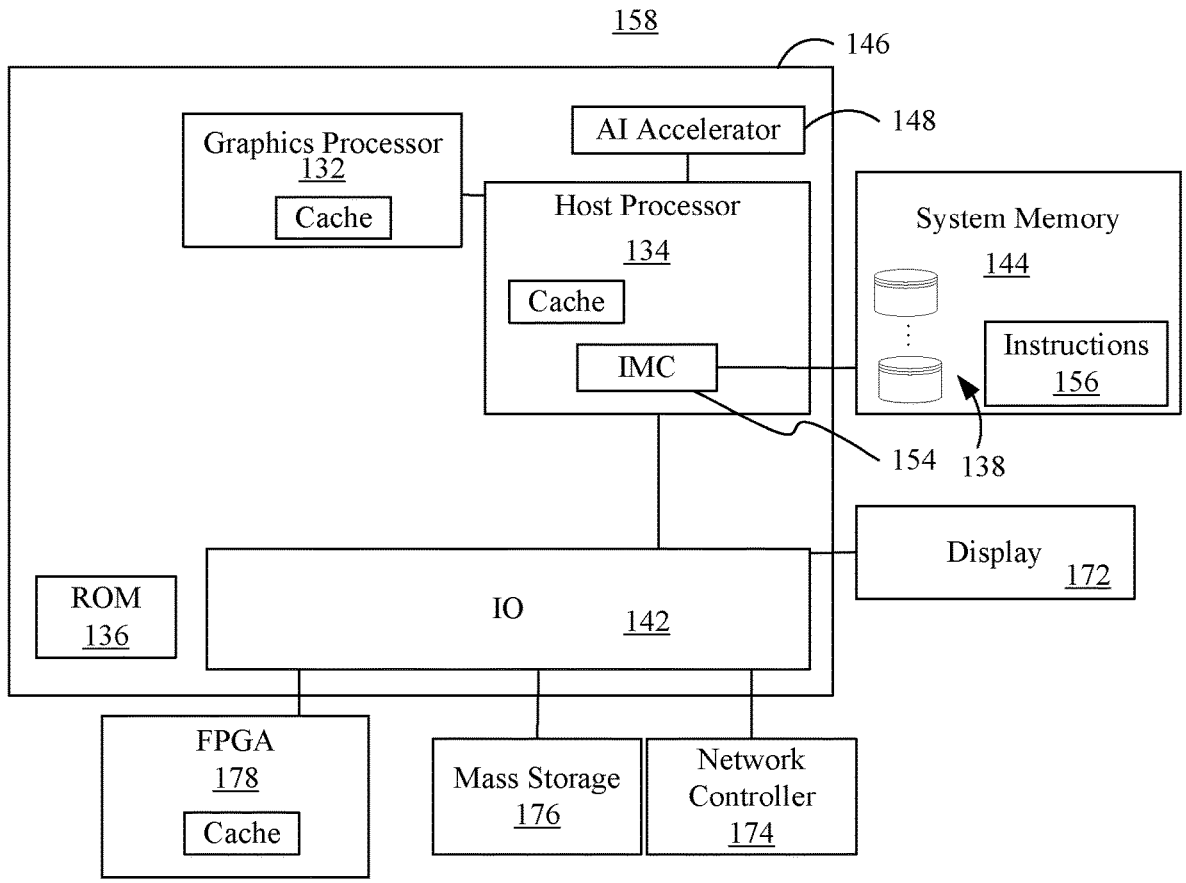
FIG. 8 is a block diagram of an example of a graph and input stream partitioning computing system according to an embodiment.

Turning now to FIG. 8, an enhanced efficiency, graph and input stream partitioning computing system 158 is shown. The input stream partitioning computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the input stream partitioning computing system 158 includes a host processor 134 (e.g., CPU) having an integrated memory controller (IMC) 154 that is coupled to a system memory 144.

The illustrated input stream partitioning computing system 158 also includes an input output (IO) module 142 implemented together with the host processor 134, a graphics processor 132 (e.g., GPU), ROM 136, and AI accelerator 148 on a semiconductor die 146 as a system on chip (SoC). The illustrated IO module 142 communicates with, for example, a display 172 (e.g., touch screen, liquid crystal display/LCD, light emitting diode/LED display), a network controller 174 (e.g., wired and/or wireless), FPGA 178 and mass storage 176 (e.g., hard disk drive/HDD, optical disk, solid state drive/SSD, flash memory). Furthermore, the SoC 146 may further include processors (not shown) and/or the AI accelerator 148 dedicated to artificial intelligence (AI) and/or neural network (NN) processing. For example, the system SoC 146 may include vision processing units (VPUs,) and/or other AI/NN-specific processors such as AI accelerator 148, etc. In some embodiments, any aspect of the embodiments described herein may be implemented in the processors and/or accelerators dedicated to AI and/or NN processing such as AI accelerator 148, the graphics processor 132 and/or the host processor 134.

The graphics processor 132 and/or the host processor 134 may execute instructions 156 retrieved from the system memory 144 (e.g., a dynamic random-access memory) and/or the mass storage 176 to implement aspects as described herein. For example, the graphics processor 132 and/or the host processor 134 may partition subgraphs and graphs into partitioned subgraphs and partitioned input streams. The input stream partitioning computing system 158 may assign the subgraphs and partitioned input streams to a plurality of hardware devices at remote locations (e.g., nodes). The host processor 134 may retrieve optimized models 138 that correspond to the subgraphs and are optimized to execute on the plurality of hardware devices. The models 138 may be executed on the hardware devices. When the instructions 156 are executed, the input stream partitioning computing system 158 may implement one or more aspects of the embodiments described herein. For example, input stream partitioning computing system 158 may implement one or more aspects of the system 100 (FIG. 1), the edgeless AI architecture 300 (FIG. 2), method 800 (FIG. 3), worker node 350 (FIG. 4), method 400 (FIG. 5), method 420 (FIG. 6) and/or process 500 (FIG. 7) already discussed. The illustrated input stream partitioning computing system 158 is therefore considered to be performance-enhanced at least to the extent that it enables the input stream partitioning computing system 158 to take advantage of low latency graph partitioning, execution and distribution to reduce processing power, overhead and far memory accesses.

Figure 9:
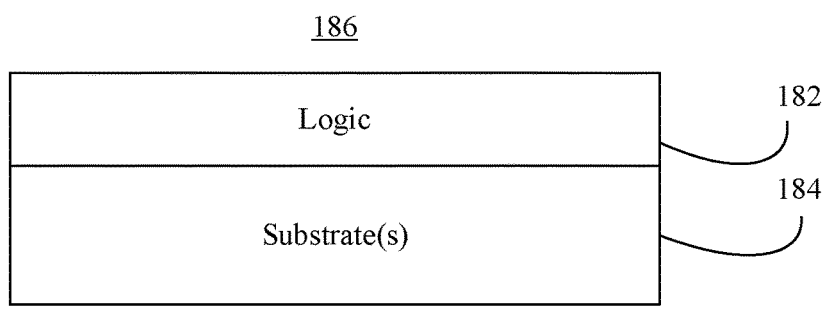
FIG. 9 is an illustration of an example of a semiconductor apparatus according to an embodiment.

FIG. 9 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein, for example, the system 100 (FIG. 1), the edgeless AI architecture 300 (FIG. 2), method 800 (FIG. 3), worker node 350 (FIG. 4), method 400 (FIG. 5), method 420 (FIG. 6) and/or process 500 (FIG. 7) already discussed. Thus, the logic 182 may analyze an input stream and an AI model graph to generate a workload characterization, wherein the workload characterization characterizes one or more of compute resources or memory resources, where the one or more of the compute resources or the memory resources is associated with execution of the AI model graph based on the input stream. The logic 182 may further partition the AI model graph into partitioned subgraphs based on the workload characterization and selects a plurality of hardware devices to execute the partitioned subgraphs. Furthermore, the logic 182 may further include processors (not shown) and/or AI accelerator dedicated to artificial intelligence AI and/or NN processing. For example, the system logic 182 may include VPUs, and/or other AI/NN-specific processors such as AI accelerators, similarity search PEs, etc. In some embodiments, any aspect of the embodiments described herein may be implemented in the processors and/or accelerators dedicated to AI and/or NN processing such as AI accelerators.

The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 10:
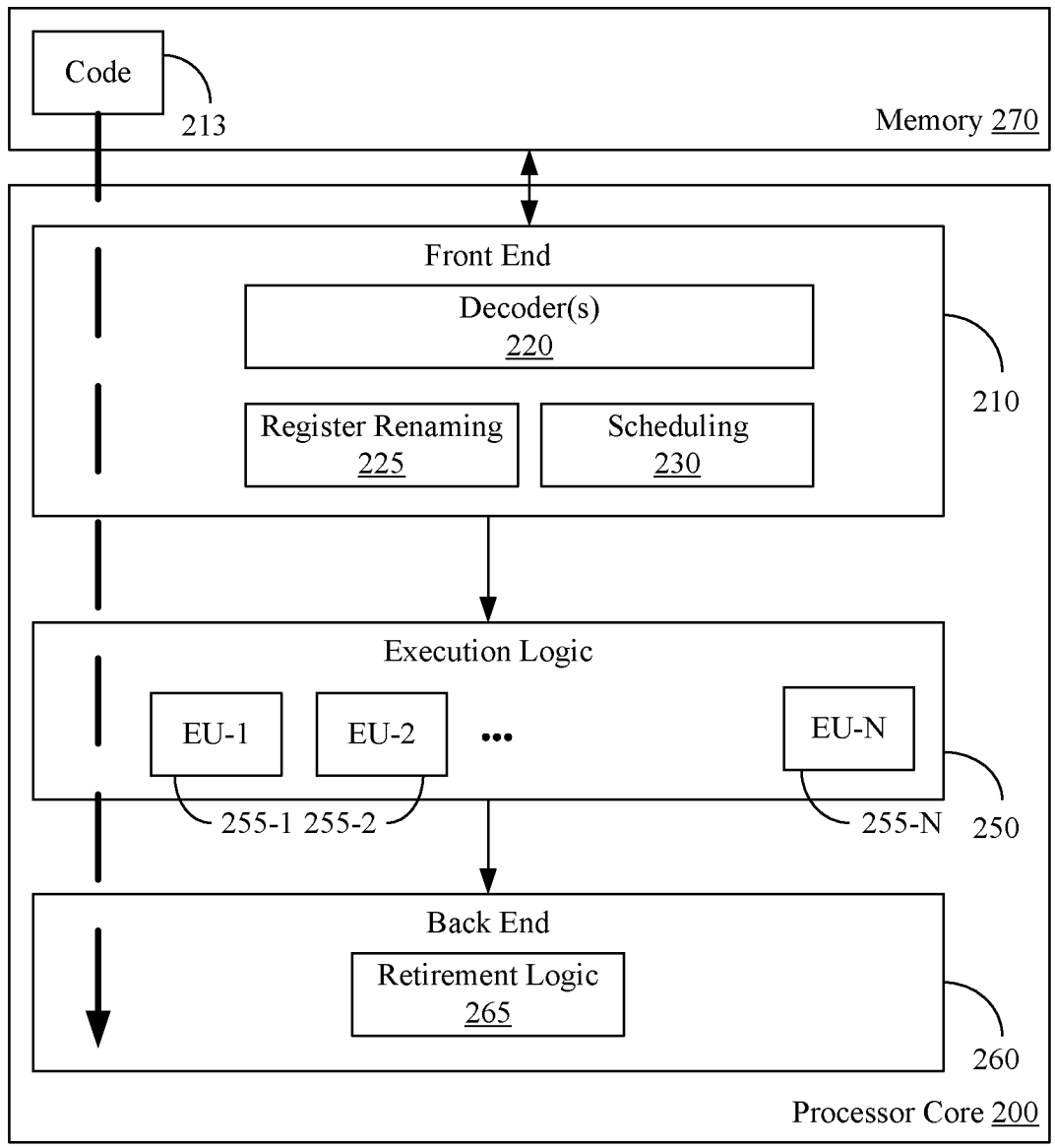
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the system 100 (FIG. 1), the edgeless AI architecture 300 (FIG. 2), method 800 (FIG. 3), worker node 350 (FIG. 4), method 400 (FIG. 5), method 420 (FIG. 6) and/or process 500 (FIG. 7) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
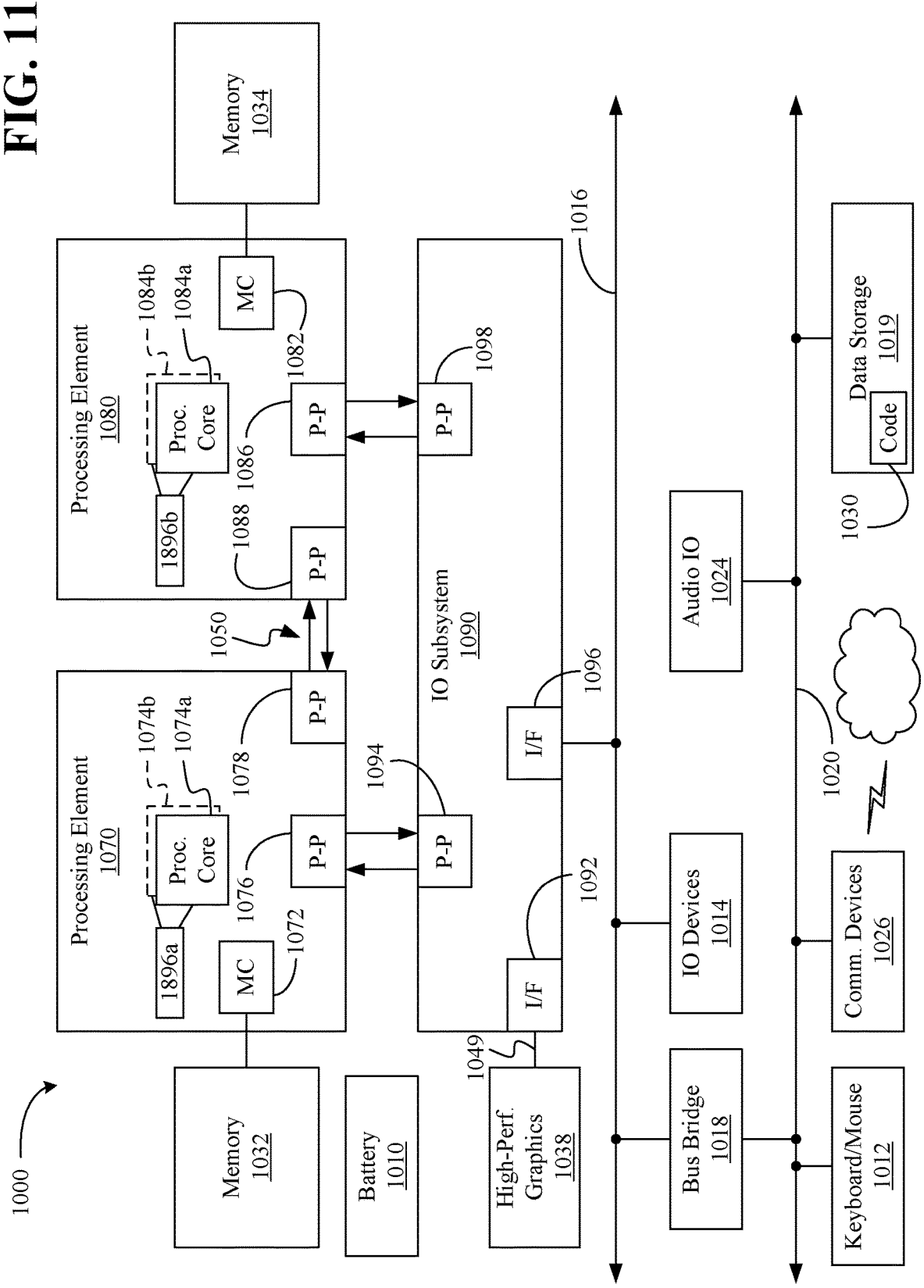
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the system 100 (FIG. 1), the edgeless AI architecture 300 (FIG. 2), method 800 (FIG. 3), worker node 350 (FIG. 4), method 400 (FIG. 5), method 420 (FIG. 6) and/or process 500 (FIG. 7) already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

ADDITIONAL NOTES AND EXAMPLES

Example 1 includes a computing system comprising a network controller to communicate with one or more nodes including hardware devices, a processor coupled to the network controller, and a memory coupled to the processor, the memory including a set of executable program instructions, which when executed by the processor, cause the processor to analyze an input stream and an artificial intelligence (AI) model graph to generate a workload characterization, wherein the workload characterization is to characterize one or more of compute resources or memory resources, wherein the one or more of the compute resources or the memory resources is associated with execution of the AI model graph based on the input stream, partition the AI model graph into subgraphs based on the workload characterization, and select a plurality of the hardware devices to execute the subgraphs.

Example 2 includes the computing system of Example 1, wherein the instructions, when executed, cause the computing system to identify data formats supported by available hardware resources, identify deep learning operators that are supported by the available hardware resources, and select the plurality of the hardware devices from the available hardware resources based on the data formats and the deep learning operators.

Example 3 includes the computing system of Example 1, wherein the instructions, when executed, cause the computing system to identify data formats associated with the AI model graph, identify deep learning operators associated with the AI model graph, and select the plurality of the hardware devices from available hardware resources based on the data formats associated with the AI model graph and the deep learning operators associated with the AI model graph.

Example 4 includes the computing system of Example 1, wherein the instructions, when executed, cause the computing system to determine a measure of a compute workload of the AI model graph, determine data output sizes of the AI model graph, and partition the input stream into partitioned input streams based on the measure of the compute workload and the data output sizes, wherein the workload characterization is to include the measure of the compute workload and the data output sizes.

Example 5 includes the computing system of Example 1, wherein the instructions, when executed, cause the computing system to determine one or more characteristics of the input stream, wherein the one or more characteristics are to include a number of input streams, a resolution, a bitrate, an encode format or a decode format, and partition the input stream into partitioned input streams based on the one or more characteristics, wherein the workload characterization is to include the one or more characteristics.

Example 6 includes the computing system of any one of Examples 1 to 5, wherein the instructions, when executed, cause the computing system to select an AI model from a plurality of AI models based on the plurality of the hardware devices, wherein the AI model is to correspond to a subgraph of the subgraphs.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to analyze an input stream and an artificial intelligence (AI) model graph to generate a workload characterization, wherein the workload characterization is to characterize one or more of compute resources or memory resources, wherein the one or more of the compute resources or the memory resources is associated with execution of the AI model graph based on the input stream, partition the AI model graph into subgraphs based on the workload characterization, and select a plurality of hardware devices to execute the subgraphs.

Example 8 includes the apparatus of Example 7, wherein the logic coupled to the one or more substrates is to identify data formats supported by available hardware resources, identify deep learning operators that are supported by the available hardware resources, and select the plurality of hardware devices from the available hardware resources based on the data formats and the deep learning operators.

Example 9 includes the apparatus of Example 7, wherein the logic coupled to the one or more substrates is to identify data formats associated with the AI model graph, identify deep learning operators associated with the AI model graph, and select the plurality of hardware devices from available hardware resources based on the data formats associated with the AI model graph and the deep learning operators associated with the AI model graph.

Example 10 includes the apparatus of Example 7, wherein the logic coupled to the one or more substrates is to determine a measure of a compute workload of the AI model graph, determine data output sizes of the AI model graph, and partition the input stream into partitioned input streams based on the measure of the compute workload and the data output sizes, wherein the workload characterization is to include the measure of the compute workload and the data output sizes.

Example 11 includes the apparatus of Example 7, wherein the logic coupled to the one or more substrates is to determine one or more characteristics of the input stream, wherein the one or more characteristics are to include a number of input streams, a resolution, a bitrate, an encode format or a decode format, and partition the input stream into partitioned input streams based on the one or more characteristics, wherein the workload characterization is to include the one or more characteristics.

Example 12 includes the apparatus of any one of Examples 7 to 11, wherein the logic coupled to the one or more substrates is to select an AI model from a plurality of AI models based on the plurality of hardware devices, wherein the AI model is to correspond to a subgraph of the subgraphs.

Example 13 includes the apparatus of any one of Examples 7 to 11, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to analyze an input stream and an artificial intelligence (AI) model graph to generate a workload characterization, wherein the workload characterization is to characterize one or more of compute resources or memory resources, wherein the one or more of the compute resources or the memory resources is associated with execution of the AI model graph based on the input stream, partition the AI model graph into subgraphs based on the workload characterization, and select a plurality of hardware devices to execute the subgraphs.

Example 15 includes the at least one computer readable storage medium of Example 14, wherein the instructions, when executed, further cause the computing system to identify data formats supported by available hardware resources, identify deep learning operators that are supported by the available hardware resources, and select the plurality of hardware devices from the available hardware resources based on the data formats and the deep learning operators.

Example 16 includes the at least one computer readable storage medium of Example 14, wherein the instructions, when executed, further cause the computing system to identify data formats associated with the AI model graph, identify deep learning operators associated with the AI model graph, and select the plurality of hardware devices from available hardware resources based on the data formats associated with the AI model graph and the deep learning operators associated with the AI model graph.

Example 17 includes the at least one computer readable storage medium of Example 14, wherein the instructions, when executed, further cause the computing system to determine a measure of a compute workload of the AI model graph, determine data output sizes of the AI model graph, and partition the input stream into partitioned input streams based on the measure of the compute workload and the data output sizes, wherein the workload characterization is to include the measure of the compute workload and the data output sizes.

Example 18 includes the at least one computer readable storage medium of Example 14, wherein the instructions, when executed, further cause the computing system to determine one or more characteristics of the input stream, wherein the one or more characteristics are to include a number of input streams, a resolution, a bitrate, an encode format or a decode format, and partition the input stream into partitioned input streams based on the one or more characteristics, wherein the workload characterization is to include the one or more characteristics.

Example 19 includes the at least one computer readable storage medium of any one of Examples 14 to 18, wherein the instructions, when executed, further cause the computing system to select an AI model from a plurality of AI models based on the plurality of the hardware devices, wherein the AI model is to correspond to a subgraph of the subgraphs.

Example 20 includes a method comprising analyzing an input stream and an artificial intelligence (AI) model graph to generate a workload characterization, wherein the workload characterization characterizes one or more of compute resources or memory resources, wherein the one or more of the compute resources or the memory resources is associated with execution of the AI model graph based on the input stream, partitioning the AI model graph into subgraphs based on the workload characterization, and selecting a plurality of hardware devices to execute the subgraphs.

Example 21 includes the method of Example 20, further comprising identifying data formats supported by available hardware resources, identifying deep learning operators that are supported by the available hardware resources, and selecting the plurality of hardware devices from the available hardware resources based on the data formats and the deep learning operators.

Example 22 includes the method of Example 20, further comprising identifying data formats associated with the AI model graph, identifying deep learning operators associated with the AI model graph, and selecting the plurality of hardware devices from available hardware resources based on the data formats associated with the AI model graph and the deep learning operators associated with the AI model graph.

Example 23 includes the method of Example 20, further comprising determining a measure of a compute workload of the AI model graph, determining data output sizes of the AI model graph, and partitioning the input stream into partitioned input streams based on the measure of the compute workload and the data output sizes, wherein the workload characterization includes the measure of the compute workload and the data output sizes.

Example 24 includes the method of Example 20, further comprising determining one or more characteristics of the input stream, wherein the one or more characteristics includes a number of input streams, a resolution, a bitrate, an encode format or a decode format, and partitioning the input stream into partitioned input streams based on the one or more characteristics, wherein the workload characterization includes the one or more characteristics.

Example 25 includes the method of any one of Examples 20 to 24, further comprising selecting an AI model from a plurality of AI models based on the plurality of the hardware devices, wherein the AI model corresponds to a subgraph of the subgraphs.

Example 26 includes an apparatus comprising means for analyzing an input stream and an artificial intelligence (AI) model graph to generate a workload characterization, wherein the workload characterization is to characterize one or more of compute resources or memory resources, wherein the one or more of the compute resources or the memory resources is to be associated with execution of the AI model graph based on the input stream, means for partitioning the AI model graph into subgraphs based on the workload characterization, and means for selecting a plurality of hardware devices to execute the subgraphs.

Example 27 includes the apparatus of Example 26, further comprising means for identifying data formats supported by available hardware resources, means for identifying deep learning operators that are supported by the available hardware resources, and means for selecting the plurality of hardware devices from the available hardware resources based on the data formats and the deep learning operators.

Example 28 includes the apparatus of Example 26, further comprising means for identifying data formats associated with the AI model graph, means for identifying deep learning operators associated with the AI model graph, and means for selecting the plurality of hardware devices from available hardware resources based on the data formats associated with the AI model graph and the deep learning operators associated with the AI model graph.

Example 29 includes the apparatus of Example 26, further comprising means for determining a measure of a compute workload of the AI model graph, means for determining data output sizes of the AI model graph, and means for partitioning the input stream into partitioned input streams based on the measure of the compute workload and the data output sizes, wherein the workload characterization is to include the measure of the compute workload and the data output sizes.

Example 30 includes the apparatus of Example 26, further comprising means for determining one or more characteristics of the input stream, wherein the one or more characteristics are to include a number of input streams, a resolution, a bitrate, an encode format or a decode format, and means for partitioning the input stream into partitioned input streams based on the one or more characteristics, wherein the workload characterization is to include the one or more characteristics.

Example 31 includes the apparatus of any one of Examples 26 to 30, further comprising means for selecting an AI model from a plurality of AI models based on the plurality of the hardware devices, wherein the AI model is to correspond to a subgraph of the subgraphs.

Thus, technology described herein may provide for an enhanced partitioning of input streams and AI models that may efficiently be executed within memory and compute constraints of hardware devices. Furthermore, the partitioned input streams and AI models may facilitate low latency and efficient analysis.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller to communicate with one or more nodes including hardware devices;
   a processor coupled to the network controller; and
   a memory coupled to the processor, the memory including a set of executable program instructions, which when executed by the processor, cause the processor to:
   analyze an input stream and an artificial intelligence (AI) model graph to generate a workload characterization, wherein the workload characterization is to characterize one or more of compute resources or memory resources, wherein the one or more of the compute resources or the memory resources is associated with execution of the AI model graph based on the input stream;
   partition the AI model graph into subgraphs based on the workload characterization; and
   select a plurality of the hardware devices to execute the subgraphs.

2. The computing system of claim 1, wherein the instructions, when executed, cause the computing system to:
   identify data formats supported by available hardware resources;
   identify deep learning operators that are supported by the available hardware resources; and
   select the plurality of the hardware devices from the available hardware resources based on the data formats and the deep learning operators.

3. The computing system of claim 1, wherein the instructions, when executed, cause the computing system to:
   identify data formats associated with the AI model graph;
   identify deep learning operators associated with the AI model graph; and
   select the plurality of the hardware devices from available hardware resources based on the data formats associated with the AI model graph and the deep learning operators associated with the AI model graph.

4. The computing system of claim 1, wherein the instructions, when executed, cause the computing system to:
   determine a measure of a compute workload of the AI model graph;
   determine data output sizes of the AI model graph; and
   partition the input stream into partitioned input streams based on the measure of the compute workload and the data output sizes,
   wherein the workload characterization is to include the measure of the compute workload and the data output sizes.

5. The computing system of claim 1, wherein the instructions, when executed, cause the computing system to:
   determine one or more characteristics of the input stream, wherein the one or more characteristics are to include one or more of a number of input streams, a resolution, a bitrate, an encode format or a decode format; and
   partition the input stream into partitioned input streams based on the one or more characteristics,
   wherein the workload characterization is to include the one or more characteristics.

6. The computing system of claim 1, wherein the instructions, when executed, cause the computing system to:
   select an AI model from a plurality of AI models based on the plurality of the hardware devices, wherein the AI model is to correspond to a subgraph of the subgraphs.

7. A semiconductor apparatus comprising:
   one or more substrates; and
   logic coupled to the one or more substrates, wherein the logic is implemented in one or more of configurable logic or fixed-functionality logic hardware, the logic coupled to the one or more substrates to:
   analyze an input stream and an artificial intelligence (AI) model graph to generate a workload characterization, wherein the workload characterization is to characterize one or more of compute resources or memory resources, wherein the one or more of the compute resources or the memory resources is associated with execution of the AI model graph based on the input stream;
   partition the AI model graph into subgraphs based on the workload characterization; and
   select a plurality of hardware devices to execute the subgraphs.

8. The apparatus of claim 7, wherein the logic coupled to the one or more substrates is to:
   identify data formats supported by available hardware resources;
   identify deep learning operators that are supported by the available hardware resources; and
   select the plurality of hardware devices from the available hardware resources based on the data formats and the deep learning operators.

9. The apparatus of claim 7, wherein the logic coupled to the one or more substrates is to:
   identify data formats associated with the AI model graph;
   identify deep learning operators associated with the AI model graph; and select the plurality of hardware devices from available hardware resources based on the data formats associated with the AI model graph and the deep learning operators associated with the AI model graph.

10. The apparatus of claim 7, wherein the logic coupled to the one or more substrates is to:
determine a measure of a compute workload of the AI model graph;
determine data output sizes of the AI model graph; and
partition the input stream into partitioned input streams based on the measure of the compute workload and the data output sizes,
wherein the workload characterization is to include the measure of the compute workload and the data output sizes.

11. The apparatus of claim 7, wherein the logic coupled to the one or more substrates is to:
determine one or more characteristics of the input stream, wherein the one or more characteristics are to include one or more of a number of input streams, a resolution, a bitrate, an encode format or a decode format; and
partition the input stream into partitioned input streams based on the one or more characteristics,
wherein the workload characterization is to include the one or more characteristics.

12. The apparatus of claim 7, wherein the logic coupled to the one or more substrates is to:
select an AI model from a plurality of AI models based on the plurality of hardware devices, wherein the AI model is to correspond to a subgraph of the subgraphs.

13. The apparatus of claim 7, wherein the logic coupled to the one or more substrates includes transistor channel regions that are positioned within the one or more substrates.

14. At least one non-transitory computer-readable storage medium comprising a set of executable program instructions, which when executed by a computing system, cause the computing system to:
analyze an input stream and an artificial intelligence (AI) model graph to generate a workload characterization, wherein the workload characterization is to characterize one or more of compute resources or memory resources, wherein the one or more of the compute resources or the memory resources is associated with execution of the AI model graph based on the input stream;
partition the AI model graph into subgraphs based on the workload characterization; and
select a plurality of hardware devices to execute the subgraphs.

15. The at least one non-transitory computer-readable storage medium of claim 14, wherein the instructions, when executed, further cause the computing system to:
identify data formats supported by available hardware resources;
identify deep learning operators that are supported by available hardware resources; and
select the plurality of hardware devices from the available hardware resources based on the data formats and the deep learning operators.

16. The at least one non-transitory computer-readable storage medium of claim 14, wherein the instructions, when executed, further cause the computing system to:
identify data formats associated with the AI model graph;
identify deep learning operators associated with the AI model graph; and
select the plurality of hardware devices from available hardware resources based on the data formats associated with the AI model graph and the deep learning operators associated with the AI model graph.

17. The at least one non-transitory computer-readable storage medium of claim 14, wherein the instructions, when executed, further cause the computing system to:
determine a measure of a compute workload of the AI model graph;
determine data output sizes of the AI model graph; and
partition the input stream into partitioned input streams based on the measure of the compute workload and the data output sizes,
wherein the workload characterization is to include the measure of the compute workload and the data output sizes.

18. The at least one non-transitory computer-readable storage medium of claim 14, wherein the instructions, when executed, further cause the computing system to:
determine one or more characteristics of the input stream, wherein the one or more characteristics are to include one or more of a number of input streams, a resolution, a bitrate, an encode format or a decode format; and
partition the input stream into partitioned input streams based on the one or more characteristics,
wherein the workload characterization is to include the one or more characteristics.

19. The at least one non-transitory computer-readable storage medium of claim 14, wherein the instructions, when executed, further cause the computing system to:
select an AI model from a plurality of AI models based on the plurality of the hardware devices, wherein the AI model is to correspond to a subgraph of the subgraphs.

20. A method comprising:
analyzing an input stream and an artificial intelligence (AI) model graph to generate a workload characterization, wherein the workload characterization characterizes one or more of compute resources or memory resources, wherein the one or more of the compute resources or the memory resources is associated with execution of the AI model graph based on the input stream;
partitioning the AI model graph into subgraphs based on the workload characterization; and
selecting a plurality of hardware devices to execute the subgraphs.

21. The method of claim 20, further comprising:
identifying data formats supported by available hardware resources;
identifying deep learning operators that are supported by the available hardware resources; and
selecting the plurality of hardware devices from the available hardware resources based on the data formats and the deep learning operators.

22. The method of claim 20, further comprising:
identifying data formats associated with the AI model graph;
identifying deep learning operators associated with the AI model graph; and
selecting the plurality of hardware devices from available hardware resources based on the data formats associated with the AI model graph and the deep learning operators associated with the AI model graph.

23. The method of claim 20, further comprising:
determining a measure of a compute workload of the AI model graph;
determining data output sizes of the AI model graph; and partitioning the input stream into partitioned input streams based on the measure of the compute workload and the data output sizes, wherein the workload characterization includes the measure of the compute workload and the data output sizes.

24. The method of claim 20, further comprising:

determining one or more characteristics of the input stream, wherein the one or more characteristics includes one or more of a number of input streams, a resolution, a bitrate, an encode format or a decode format; and partitioning the input stream into partitioned input streams based on the one or more characteristics, wherein the workload characterization includes the one or more characteristics.

25. The method of claim 20, further comprising:

selecting an AI model from a plurality of AI models based on the plurality of the hardware devices, wherein the AI model corresponds to a subgraph of the subgraphs.

* * * * *